No. 870,118. PATENTED NOV. 5, 1907.
G. J. MILLER.
BROILER.
APPLICATION FILED JAN. 19, 1907.

3 SHEETS—SHEET 1.

Witnesses.

Inventor:
George J. Miller
By Rich A. Manning
Attorney.

No. 870,118.

PATENTED NOV. 5, 1907.

G. J. MILLER.
BROILER.
APPLICATION FILED JAN. 19, 1907.

3 SHEETS—SHEET 2.

Witnesses.

Inventor.
George J. Miller

No. 870,118.
PATENTED NOV. 5, 1907.
G. J. MILLER.
BROILER.
APPLICATION FILED JAN. 19, 1907.
3 SHEETS—SHEET 3.
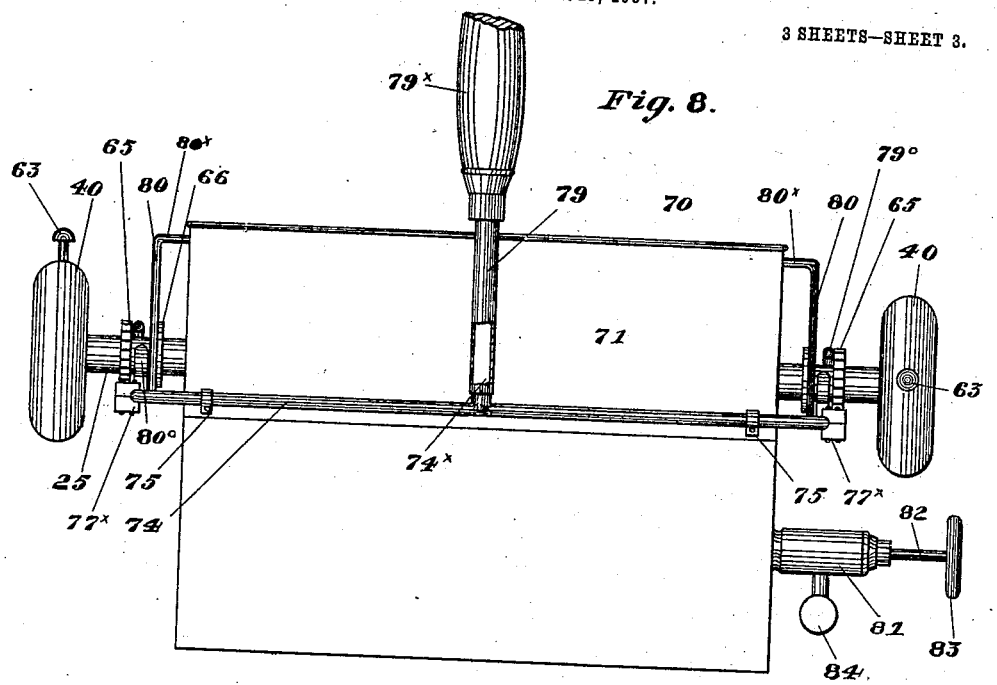
Fig. 8.
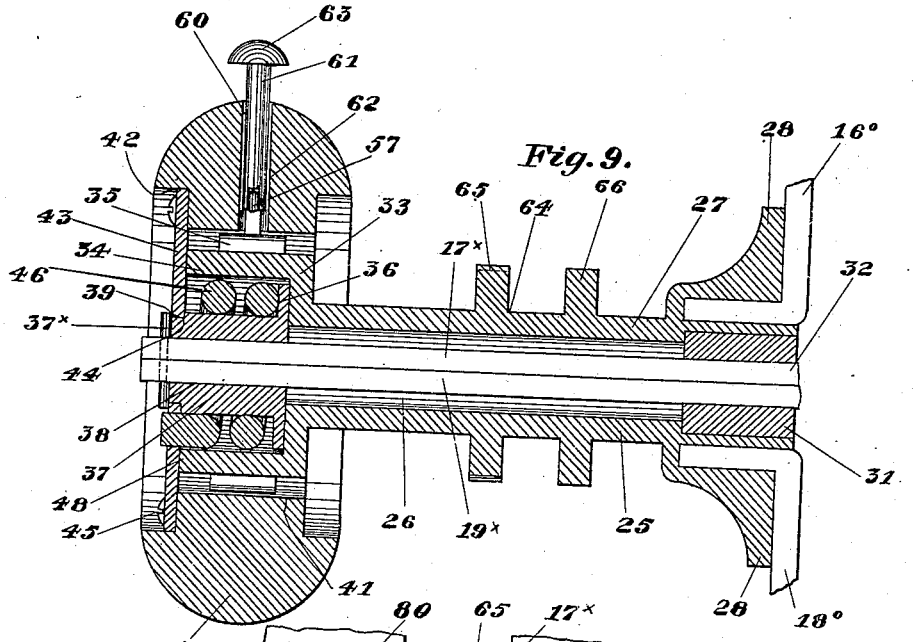
Fig. 9.
Fig. 10.
Witnesses.
Inventor.
George J. Miller
By his Attorney

UNITED STATES PATENT OFFICE.

GEORGE J. MILLER, OF KANSAS CITY, MISSOURI.

BROILER.

No. 870,118.  Specification of Letters Patent.  Patented Nov. 5, 1907.

Application filed January 19, 1907. Serial No. 353,089.

*To all whom it may concern:*

Be it known that I, GEORGE J. MILLER, a citizen of the United States of America, residing in Kansas City, in the county of Jackson and State of Missouri, have invented certain new and useful Improvements in Broilers; and I do hereby declare that the following is a clear and exact description of the invention, such as will enable others to make and use the same, reference being had to the accompanying drawings, forming a part of this specification.

The invention relates particularly to the broiler in a broiling apparatus between which the meat or other articles to be broiled is held and its position changed so as to subject the various portions of the meat to the heat, the apparatus being made the subject matter of a prior application which was filed in the United States Patent Office September 27th, 1906, Serial Number 336764.

The object of the present invention is to enable joints of meat and fowls of various proportions to be grasped and held with equal degrees of force during the operation of broiling.

The invention consists in novel construction and combination of parts such as will be first fully described and then specifically pointed out in the claims.

Figure 1:
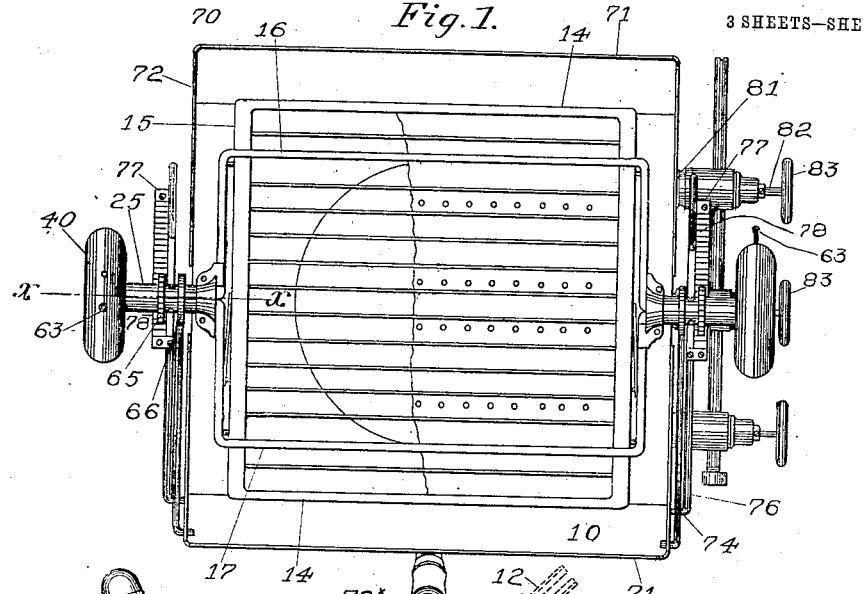
Figure 2:
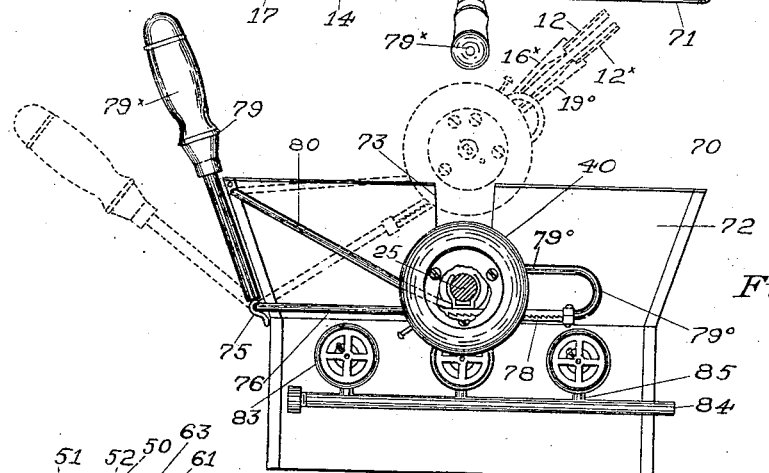
Figures 4, 5, 6:
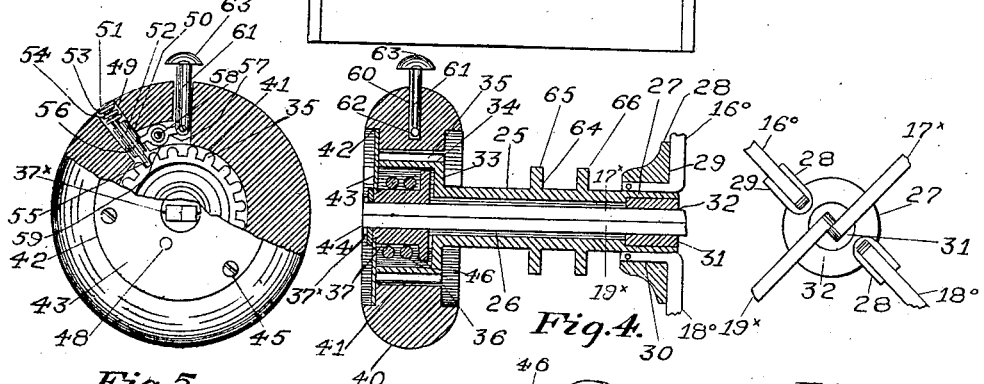
Figure 7:
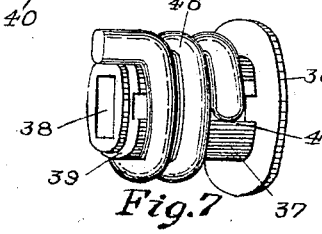
Figure 3:
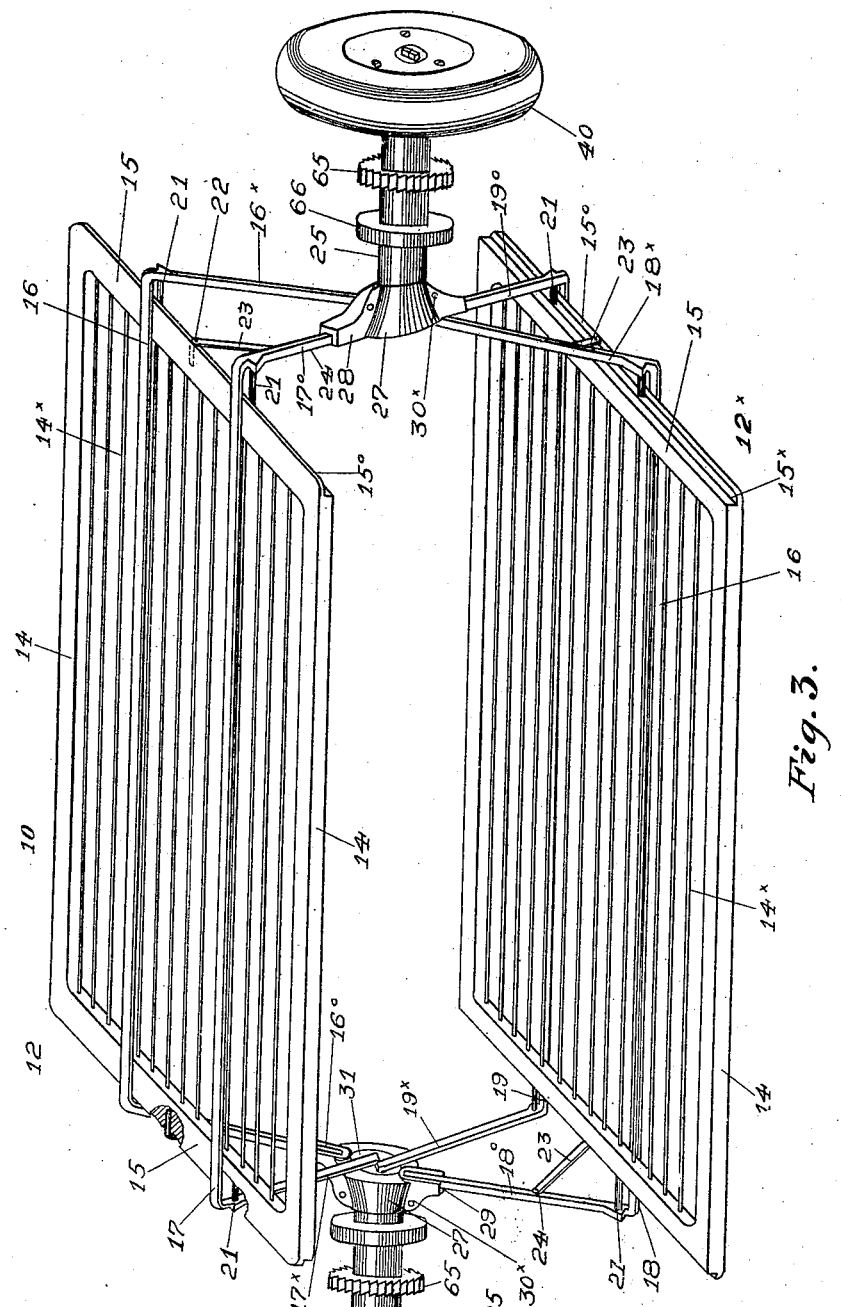

In the drawings, Figure 1 is a plan view of a broiling apparatus showing the broiler in position therein. Fig. 2 is an end view as seen in Fig. 1 the broiler being shown in an elevated position in dotted lines with the frames in a folded or closed position. Fig. 3 is an enlarged view in perspective of the broiler. Fig. 4 is a longitudinal vertical sectional view of the handle or spindle of the broiler taken upon the line $x\ x$ on Fig. 1. Fig. 5 is an end view of the handle or spindle, a portion being broken away to show the dog, the notched spindle and the dog releasing device. Fig. 6 is a view in detail of the inner end of the spindle showing broken portions of the frame extending arms. Fig. 7 is a detail view in perspective of the circular plate and projection within the casing at the outer end of the spindle showing the coiled springs. Fig. 8 is an enlarged side view in elevation of the case or box. Fig. 9 is an enlarged longitudinal vertical sectional view in detail of the spindle upon the broiler as seen in Fig. 4. Fig. 10 is a view of a broken portion of one end of the case or box.

Similar numerals of reference indicate corresponding parts in all the figures of the drawing.

Referring to the drawings, 10 indicates the broiler which consists of separate holders or frames 12 and $12^X$ for the articles to be broiled, which are rectangular in form and arranged with their broad surfaces opposite to each other in position. The longitudinal sides 14 and the ends 15 of the respective frames consist of narrow strips of suitable material and connected rigidly with the inner surfaces of one end of the respective frames are wires $14^X$ which extend parallel with sides 14 of the frame and are also connected rigidly with the inner surfaces of the other ends of said frames and spaced apart in the transverse direction of the frames. Upon the ends of the respective frames 12 and $12^X$ are flanges $15^X$ extending from the lines of the outer surfaces. 25 indicates the hollow spindles or handles by means of which the broiler is operated and also supported for rotation within the case or box and in which spindles are the longitudinal openings 26. Extending radially to the spindles are the extension folding arms $16^X$ $17°$ $18^X$ and $19°$ extending from one spindle and the arms $16°$ $17^X$ $18°$ and $19^X$ extending from the other spindle. With the outer ends of the radial arms $16^X$ $16°$ extending from the respective spindles is connected rigidly the ends of a longitudinal connecting bar 16 and with the outer ends of the arms $17^X$ $17°$ is connected rigidly the ends of a longitudinal connecting bar 17, these bars extending parallel with each other upon the outer longitudinal surfaces of the frame 12. With the outer ends of the radial arms $18^X$ $18°$ and the arms $19^X$ $19°$ are connected rigidly the respective ends of the longitudinal connecting bars 18 and 19, which bars extend parallel with each other in the longitudinal directions and upon the outer surface of the frame $12^X$, the said bars 16—17 and 18—19 being slightly longer than the respective frames 12 and $12^X$. Connected rigsdly with the inner surfaces of each of the respective radial arms at a point a short distance inwardly from their point of connection with the respective bars 16, 17, 18, 19 are pins 21 which extend transversely to the inner surfaces of the ends 15 of the frames and upon the inner surfaces of the flanges $15^X$ and forming bearings or supports for the frames. In the outer surfaces of the flanges $15^X$ upon the ends 15 of the respective frames 12 and $12^X$ at points intermediate the lines of the sides 14 are perforations 22 in which extend the bent outer ends of spring bars 23, the inner ends of said bars being pivotally connected at 24 with the inner surfaces of the radial arms $17^X$ and $17°$ and the arms $18^X$ and $18°$ to the respective frame at points equidistant from the longitudinal bars 14 on the respective frames 12 and $12^X$. Connected rigidly with the outer surfaces of the inner end 27 of each spindle 25 are short radial extensions or lugs 28; these lugs extending in opposite directions to each other and upon opposite sides of a line extending diametrically through the spindle. (See Fig. 6). Upon the inner surfaces of the lug 28 are grooves 29 extending radially to the outer surfaces of said spindles and from said grooves adjacent to the line of the circumference of the spindle extend the openings 30, these openings being directed toward the outer ends of said spindles. The inner circumference of the spindles at their inner ends are slightly increased for a short distance and within said ends are fitted loosely the rotary bearings 31, in which bearings are rectangular shaped openings 32. At the outer ends of the spindles and formed integral therewith are radial flanges 33 and extending from the outer edges of said flanges are the cylindrical casings 34, upon the outer surfaces of which casings are rack teeth 35, extending in series around the casings and in the longitudinal direction thereof. Within the casings 34 in each spindle is an annular plate 36 which is adjacent to the inner surfaces of the flanges 33 and is capable of partial rotation. Upon the outer surfaces of the plate 36 is an outward projection or neck 37 smaller in circumference than the plate 36, the outer end of which projection extends to a position slightly beyond the line of the outer end portions of the casing 34. Extending axially through this plate 36, and the projection 37 is a rectangular formed opening 38. The extreme outer end of the neck projection 37 is slightly reduced in circumference so as to form a shoulder 39.

40 indicates circular blocks or knobs which are grasped by the hand in operating the frames 12, 12$^X$ in each of which knobs is a central opening 41 of a proper size to receive or fit, rotatively over the teeth 35 on the casing 34 on the spindle 25. The forward and rear surfaces of the knob extend a slight distance beyond the ends of the casing 34. In the forward surface of the knob is a circular depression 42 slightly larger in circumference than the opening 41 in which depression is a circular plate 43, in which plate is a central opening 44, within which opening extends the shoulder 39 on the projection or neck 37 on plate 36. This plate 43 is secured to the knob 40 by the screws 45.

It will be observed that the radial arms connected with the respective longitudinal bars 16—17 and 18—19 are alternately long and short the bar 16 being connected with a short arm 16° at one end and with a long arm 16$^X$ at the other end. The other radial arms are designated and connected with the respective bars on the frames 12 and 12$^X$ in like manner. The inner ends of the short arms extend within the grooves 29 in the respective oppositely extended lugs 28 and the extreme ends of these short arms are bent at right angles and extended within the openings 30 in the lugs 28 on the respective spindles and are secured therein by the rivets 30$^X$.

The inner ends of the arms 16$^X$ 18$^X$, 17$^X$ and 19$^X$ are bent at right angles to the respective arms and extended within the rectangular shaped openings 32 in the bearings 31 in the opening 26 of the respective spindles 25, in the direction of the spindles extending through said openings toward the respective frames 12 and 12$^X$ in parallel lines thence through the square openings 38 in the annular plates 36 and the projections 37, and a short distance beyond the outer surfaces of said projections 37 and through said ends extends transversely the securing pins 37$^X$ which pins secure the plates 43 on the knobs 40 from being removed from the spindle. Within the casing 34, at the outer ends of each spindle is a coiled spring 46 which extends as shown twice around the outer surface of the projection 37 the inner end of the spring toward the plate 36, being bent downwardly and extended within a groove 47 in the projection or neck 37 of plate 36 the outer end of the spring being bent outwardly toward the plates 43 on the knob 40 and secured within perforation 48 in said plates. (See Fig. 9.) Extending through the spherical portion of the knob 40 in the direction of the teeth 35 on the casing 34 is a circular opening 49 in which is inserted a casing or tube 50, the outer end 51 being closed. Within the tube or casing 50 is an annular plate or dog 52 upon the upper end of which dog is a short pin 53. Extending around said pin is a coil spring 54, one end of which spring bears upon the upper end of the dog and the other end against the inner surfaces of the end 51 of the casing. Upon the lower end of the dog 52 is a narrow extension 55 which extends between the teeth 35 on the casing 34. In the side of the dog 52 is a transverse opening 56 within which opening extends one end of a lever 57 pivoted at 58 at a point between its ends to the knob 40, the lever working in a recess 59, in the knob, the pivot 58 extending transversely through the knob. In the knob 40 forward of the casing 50 upon a radial line from casing 34, extending outwardly past the outer end of the lever 57 is an opening 60 in which is a pin 61, having a slot 62 on the lower end to receive the outer end of lever 57, with which end the pin 53 on the dog 52 is pivotally connected. Upon the outer end of the pin is cap 63.

Upon the outer surfaces of the spindles and extending around said spindles at points about intermediate the knobs 40 and the inner end 27 of said spindles are circular fixed plates or extensions 64 upon the surface of which plates are ratchet teeth 65. Between said plates 64 and the said inner ends 27 of the spindles are circular extensions or plates 66 of the same circumference as the plates 64.

70 indicates the frame of the broiling apparatus within which the broiler is supported in position and rotated in the operation of broiling and briefly consists of a rectangular shaped box, the upper portion of the sides 71 of which box are inclined outwardly at an angle to the lower portions. In the ends 72 of the box are transverse openings 73 to receive the spindles upon the broiler. The circular plates 66 on the spindles 25, which are adjacent to the outer surfaces of said ends 72 of the box serves to preserve a uniform distance between the knobs 40 and the ends of the box. A rock shaft 74 extends lengthwise of the box and is hinged to the outer surface of the rear side 71 of the box in the bearings 75 at a point intermediate the top and bottom of the box. (See Fig. 8.) With the ends of the rock shaft 74 which extend a short distance beyond the vertical lines of the sides of the box are connected rigidly the inner ends of the lever arms 76 which lever arms extend at right angles to the rock shaft and parallel with the ends 72 of the case or box and about two thirds the distance in the direction of the forward side of said box. Upon the outer surfaces of the lever arms and parallel therewith are longitudinal flat bars 77. These bars are secured rigidly to said lever arms by means of clamps 77$^X$ at each end of said bar. Upon the upper surfaces of the bars 77 are ratchet teeth 78. At a point intermediate the ends of the rock shaft 74 is connected rigidly a short lever arm 74$^X$ which extends upwardly a short distance and bears normally upon the outwardly inclined surface of the upper portion of the rear side of the box.

79 indicates a loose thimble or socket which receives into its lower end the upwardly extended lever arm 74$^X$. With the upper end of the said thimble or socket 79 is connected a handle 79$^X$. The forward ends of the lever arms 76 are bent upwardly in a curved line and extend rearwardly a short distance as at 79°.

80 indicates guide rods inwardly bent portions 80$^X$ of the upper ends of which rods are connected pivotally with the outer surface and rear upper end portions of the ends 72 of the box, the forward ends of the rods being rigidly connected at 80$^X$ with the U shaped journal boxes 80° in which the spindles 25 of the broiler are supported.

Longitudinally extended perforate pipes or burners 81 extend through one end of the box at points about one-third the distance upwardly from the bottom of said box in which are the valve stems 82 and a handle 83 on each stem the gaseous fuel being supplied from a main pipe 84 by means of a branch pipe 85.

For the purpose of introducing the meat between the frames 12 and 12$^X$ of the broiler the broiler is removed from the journal boxes 80° upon the case or box. The knobs 40 on the respective spindles 25 are then seized by the right and left hands so that the thumbs of each hand will press on the caps 63 on the dog releasing pins 61 on the knobs 40, forcing said pins inwardly and raising the dogs 50 from engagement with the teeth 35 on the casing 34 on the outward end of the respective spindles 25. The knobs 40 on the spindles held by the right hand is then given a partial rotation to the left or toward the operator and at the same time the knob 40 on the other spindle held by the left hand is given a partial rotation in the opposite direction or from the operator in which torsional movement the twisting or torsion applied to the knob 40 held by the right hand is transmitted through the respective lever arms, longitudinal bars 16—17—18—19 to the left hand and communicated to the plates 43 thence to the springs 46 which are secured to said plates and upon which springs a relative twisting and untwisting movement is obtained; the said bars 16—17—18—19 moving or sliding outwardly upon the outer surfaces of the frames 12 and 12$^X$. The meat or fowl to be broiled is then placed between the inner surfaces of the folding grasping members of said frames 12 and 12$^X$. The dogs 50 being held out of engagement with the teeth 35 on the casing 34 of the spindles, motion is imparted to the knobs 40 on said spindle in reverse directions to that heretofore described in the operation of extending the frames 12 and 12$^X$ of the broiler and in this latter movement the frames are brought with the inner surfaces of the wires 14$^X$ firmly upon the meat or fowl and holding the same in position to be rotated and at the same time the springs are under tension caused by the power communicated to knobs 40 to grasp the meat. The dog releasing pins 61 are then caused to engage with the teeth 35 on the casing 34 locking the knobs with the spindles. During the broiling a shrinkage occurs in the meat or article broiled by reason of the evaporation of the juices and as the shrinkage takes place the springs 46 exerts a constant pressure upon the lever arms and draws the frames 12 and 12$^X$ inwardly in a degree proportionate to the reduction or shrinkage of the meat. The broiler being supplied with the meat, it is then placed with the spindles 25 extending within the openings 73 in the ends of the box within the journals 80° and the ratchet teeth 65 on plate 64 placed in position upon the ratchet teeth 78 upon the bars 77 on the lever arms 76. Power being applied to the lever 79$^X$ the lever arms are raised in position elevating the broiler in which upward movement the journal box 79 being guided by the rods 80 the ratchet teeth 78 upon the bars 77 which is engaged by the ratchet teeth 65 on the plate 64 in the spindles 25 of the broiler causes said wheels to rotate in the upward movement of said broiler so as to bring various surfaces of the meat in position over the fire.

In the completion of the broiling the broiler is removed from the box or case 70 the dogs released by the hands which grasp the knobs 40 the meat taken from the broiler, and, in releasing the dogs from the engagement with the teeth 35 after the removal of the meat, the frames readily close or fold together. The springs 46 in conjunction with the plates 43 on the knobs 40 and the spindles 25 so act that when a steak is placed between the holders or frames 12 and 12$^X$ the tension of the springs will cause the frames 12 and 12$^X$ to maintain a constant pressure upon the meat and retain the same yieldingly during the rotation of the holders. The folding spring bar 23 act to maintain the axial alinement of the longitudinal axes of the grasping frames 12 and 12$^X$ of the broiler with the longitudinal axes of the supporting handles or spindles 25 in the opening and closing of the folding radial arms supporting the frames so that the frames move toward each other and fold so as to affect correspondence of like parts in contact. Upon releasing the engaging ends of said spring bars 23 from the ends of the frames 12 and 12$^X$ it is obvious that the frames can be withdrawn from the supporting pins 21 in the radial arms for the purpose of cleaning the frames. Various changes in the forms and proportions of the broiler may be made as the exigencies require.

Having fully described my invention what I now claim as new and desire to secure by Letters Patent is 1. In a rotary broiler the combination with opposite, grasping members for the article to be broiled of axial supports for said members and adjustable folding arms upon said supports for the said members and means for securing said folding arms in an open or closed position upon said axial supports.

2. In a rotary broiler the combination with opposite grasping members for the article to be broiled of axial supports for said members and pivotally connected folding arms upon said supports for said members means for adjusting said arms in an open or closed position and means for locking said arms on said axial supports.

3. In a rotary broiler the combination with supporting handles of opposite movable grasping holders for the article to be broiled and pivotally connected folding arms supporting said holders upon said handles.

4. In a rotary broiler the combination with separate folding grasping frames for the articles to be broiled and with folding arms for said grasping frames of means coacting with the folding arms to maintain the longitudinal axes of the frames in coincident alining positions with the axis of the broiler in moving to and from each other.

5. In a rotary broiler the combination with separate grasping frames for the article to be broiled and hollow spindles forming the axis of said frames and rotary bearings in said spindles radial arms yieldingly connected with said frames and having their inner ends connected respectively with said spindles and rotatively with the rotary bearings in said spindles means for operating the arms connected with the rotary bearings and alining devices pivotally connected with said arms and the said frames.

6. In a rotary broiler the combination with axial supports and radial extension arms on said supports and connecting devices connecting the outer ends of said arms on the respective supports of frames between which the articles to be broiled is held having flanges in the ends thereof and supporting devices upon said arms extending beneath said flanges.

7. In a rotary broiler the combination with folding frames and axial supports and radial arms upon said supports for said frames of connecting bars connected with the outer ends of said arms on the respective axial supports and supporting devices for said frames upon said arms and pivoted spring bars upon said arms detachably connected with said frames.

8. In a rotary broiler the combination with holders between which the article to be broiled is held and with pivoted folding arms connecting said holders with each other of means for holding said arms in a position under tension.

9. In a rotary broiler the combination with holders between which the article to be broiled is held of hollow spindles rotary bearings within said spindles, radial arms connected respectively with said spindles and said holders and separate radial arms connected with said holders having extensions extending within said spindles and mechanism upon the spindles for imparting a partial rotary movement to said extensions of said arms.

10. In a rotary broiler the combination with opposite grasping holders for holding the article to be broiled and hollow spindles or handles of radial arms connected at their outer ends with the ends of the respective holders and at their inner ends with said spindles and separate radial arms connected with said holders and extensions of the inner ends of said arms extending within said hollow spindles rotatable bearings within the inner ends of said spindles through which said extensions of said arms are rotatably supported rotary knobs on said spindles and resilient connecting mechanisms connecting said knobs with said extensions of said arms.

11. In a broiler the combination with opposite holders for the articles to be broiled of hollow spindles, radial arms connected with said frames and the respective spindles and separate radial arms connected with said frames and having extensions extending within said hollow spindles rotary bearings within said spindles for said extensions of said arms and means for securing said arms in position.

12. In a broiler the combination with holders between which the article to be broiled is held and hollow spindles radial arms connected with and supporting said holders lugs on said spindles radial arms with which said lugs are connected, separate radial arms bent extensions of which extend parallel with each other within said hollow spindles rotatable bearings within the inner ends of the spindles fixedly connected with said extensions of said arms, rotary knobs on said spindles torsion springs respectively connected with said rotary bearings for the extended portions of said arms and the said knobs and means for locking said knobs on said spindles.

13. The combination with hollow spindles supporting the broiler and inner and outer rotary bearings within the spindles and radial arms having bent portions extending within said spindles and connected rotatively within said bearings and separate radial arms connected rigidly with said spindles of bars connected at their respective ends with the outer ends of the arms on the respective spindles knobs having central openings adapted to receive the outer ends of said spindles, plates connected with the said knobs, springs within said spindles having their outer ends connected with said plates on said knobs, and their inner ends with outer bearings for the extended portions of the radial arms and interlocking devices on said knobs and spindles.

14. In a broiler the combination with opposite grasping frames and handles having separate rotatively connected parts supporting said frames of pivoted frame extending folding arms on said handles and means actuated by one portion of said handles for opening and closing said folding arms.

15. In a broiler the combination with opposite grasping frames and spindles at the axis of the broiler of knobs rotatively connected with the spindles, spring actuated locking devices on said knobs engaging with the spindles, frame extending devices on said spindles and actuated thereby and by said knobs and yielding connecting devices connecting said devices with said knobs.

16. In a broiler the combination with opposite grasping holders and hollow spindles at the axis of said broiler and knobs rotatively connected with said spindles of plates on said knobs at the outer ends of said spindles rotary bearings within said spindles near the inner and outer ends, radial arms connected rigidly with said spindles at their inner ends and separate radial arms having the inner ends extending within said bearings bars connected with the outer ends of the respective radial arms on the respective spindles and extensions on the outer bearings within the spindles, coiled springs on the respective extensions having their inner ends connected therewith and the outer ends connected with the plates on said knobs.

17. In a rotary broiler the combination with opposite grasping frames for the article to be broiled and with radial folding arms supporting said frames of axial supports for said radial arms and means coacting with said radial folding arms to maintain the alinement of said grasping frames with said axial supports in the movement of said frames to and from each other.

GEORGE J. MILLER.

Witnesses:
WM. WALTER BRADY,
F. R. MADEDA.